United States Patent [19]
Aihara et al.

[11] Patent Number: 5,422,226
[45] Date of Patent: Jun. 6, 1995

[54] OPTICAL RECORDING MEDIUM

[75] Inventors: Shin Aihara, Yokohama; Yuko Suzuki, Kamakura; Sumio Hirose, Yokohama, all of Japan

[73] Assignee: Mitsui Toatsu Chemicals, Inc., Tokyo, Japan

[21] Appl. No.: 171,153

[22] Filed: Dec. 22, 1993

[30] Foreign Application Priority Data

Dec. 25, 1992 [JP] Japan ................................. 4-346333

[51] Int. Cl.$^6$ .............................................. G11B 7/24
[52] U.S. Cl. ..................................... 430/273; 430/495; 430/945; 369/284; 369/288
[58] Field of Search ................. 369/284, 288; 430/273, 430/495, 945

[56] References Cited

U.S. PATENT DOCUMENTS

| | | | |
|---|---|---|---|
| 4,590,493 | 5/1986 | Inoue et al. | 346/135.1 |
| 4,957,776 | 9/1990 | Higuchi et al. | 427/54.1 |
| 5,312,663 | 5/1994 | Kosinski et al. | 428/64 |

FOREIGN PATENT DOCUMENTS

| | | |
|---|---|---|
| 0548968 | 6/1993 | European Pat. Off. . |
| 0549488 | 6/1993 | European Pat. Off. . |
| 2-7249 | 1/1990 | Japan . |
| 2-068788 | 3/1990 | Japan . |
| 2-132657 | 5/1990 | Japan . |
| 2-147286 | 6/1990 | Japan . |
| 2-149951 | 6/1990 | Japan . |
| 2-168448 | 6/1990 | Japan . |
| 3-40239 | 2/1991 | Japan . |
| 3-130981 | 6/1991 | Japan . |
| 3-232130 | 10/1991 | Japan . |
| 3-232131 | 10/1991 | Japan . |
| 3-232132 | 10/1991 | Japan . |
| 4-285736 | 10/1992 | Japan . |
| 5-325259 | 12/1993 | Japan . |
| WO90/14657 | 11/1990 | WIPO . |

OTHER PUBLICATIONS

Patent Abstracts of Japan, vol. 17, No. 84 (P-1490), Feb. 19, 1993, JP-A-4285736, Oct. 9, 1992.
Patent Abstracts of Japan, vol. 16, No. 15 (P-1298), Jan. 14, 1992, JP-A-3232130, Oct. 16, 1991.
Patent Abstracts of Japan, vol. 15, No. 180 (P-1199), May 9, 1991, JP-A-3040239, Feb. 20, 1991.
Nikkei Electronics, Taiyo Yuden Co., Ltd., No. 465, p. 107. Jan. 23, 1989, "A Writing Type Optical Disk Satisfying CD Standards, Recording by Heat Deformation Occuring at an Interface Between a Subtrate and a Dye Layer", (with English Abstract).

Primary Examiner—Charles L. Bowers, Jr.
Assistant Examiner—John A. McPherson
Attorney, Agent, or Firm—Oblon, Spivak, McClelland, Maier & Neustadt

[57] ABSTRACT

An optical recording medium comprises a transparent substrate, a recording layer containing at least one organic dye overlying the substrate, a metallic layer directly contacting and overlying the recording layer, a protective layer comprising at least one layer directly contacting and overlying the metal layer, a layered print portion comprising at least one layer directly contacting and overlying the protective layer, and said protective layer and said print portion satisfying the following relationship:

$$\Sigma A_i B_i + \Sigma C_j D_j < 3 \; (\mu m) \quad (1)$$

where $A_i$ ($\mu m$) is a thickness and $B_i$ is a curing shrinkage rate of the i-th protective layer, respectively, where i is an integer of 1 or more, $C_j$ ($\mu m$) is a thickness and $D_j$ is a curing shrinkage rate of the j-th print portion layer, respectively, where J is an integer of 1 or more.

25 Claims, 1 Drawing Sheet

OPTICAL RECORDING MEDIUM

BACKGROUND OF THE INVENTION

1. Field of the Invention

The present invention relates to an optical recording medium, and more particularly, to an organic dye-containing optical recording medium capable of writing once.

2. Description of the Related Art

An optical recording medium for reading out only has been put to practical use as a compact disc (hereinafter referred to as CD). This medium can be produced by forming recording information and a prepit or a pregroove for tracking to reproduce the recording information on a substrate made of a transparent polycarbonate and the like using a press or the like in advance, forming a reflective layer composed of a metal film such as Au, Al and the like on the surface where the pit is formed, forming a protective layer made of a photo-curable resin overlying the reflective layer, providing label-printing with a photo-curable ink on the protective layer. The CD has spread widely for the purpose of recording or reproducing music, image, data, program and the like. Specifications for recording and reproducing signals of the CD are prescribed by the CD standards, and a reproducing apparatus pursuant to the CD standards have spread widely as a CD player.

Recently, an optical recording medium capable of writing once (hereinafter referred to as CD-R) that the recorded disc meets the CD standards has attracted attention since the CD-R can be reproduced with a commercially available CD player.

The CD-R is an optical recording medium producible by forming on a transparent substrate an organic dye-containing recording layer, a metallic reflective layer and protective layer and is disclosed in Nikkei Electronics (No. 465, published on Jan. 23, 1989, page 107), Japanese Patent Application Laid-Open No. Hei 2-132657, Japanese Patent Application Laid-Open No. Hei 2-147286, Japanese Patent Application Laid-Open No. Hei 2-168448 and the like. The CD-R has been known as an optical recording medium capable of recording information as signals by changing an organic dye-containing recording layer using laser beam irradiation from a transparent substrate side. It is possible to reproduce the recording and reproducing signals by a CD player since a metallic reflective layer results in a high reflectivity and a clear contrast. For the purpose of preventing a dye-containing recording layer and a metallic reflective layer from a scratch, a protective layer is formed on the reflective layer and moreover label-printing is provided on the protective layer to indicate disc specifications and the like. The label-printing is not only for decoration but also plays a role to show recording contents, disc specifications and the like and is vital for practical use. As far as a protective layer and a print portion of an optical recording medium are concerned, Japanese Patent Application Laid-Open No. Hei 2-7249 and the like disclose that both a protective layer and a print portion are formed by screen-printing to simplify a manufacturing method. Japanese Patent Application Laid-Open No. Hei 3-40239 discloses that it is possible to improve mechanical properties and durability of a protective layer by forming a first print portion and a second print portion on the protective layer. Although these prior arts show some characteristics concerning a production process or layer constitution, conditions of a print portion and a protective layer including the effects of the print portion are not disclosed therein. It is considered that this is attributed to that it is not necessary to pay attention thereto since a print portion does not affect recording characteristics of a medium such as a conventional CD, a write-once medium, an optomagnetic recording medium and the like.

With respect to conditions of a protective layer employed for a CD-R, for example, Japanese Patent Application Laid-Open No. Hei 3-232130, Japanese Patent Application Laid-Open No. Hei 3-232131, Japanese Patent Application Laid-Open No. Hei 3-232132 and the like define hardness, expansion coefficient and shrinkage rate of a protective layer are defined. However, conditions of a print portion and a protective layer including the effects of the print portion are not shown therein.

The present inventors have investigated a CD-R having constitution that an organic dye-containing recording layer, a metallic reflective layer, a protective layer and a print portion are formed successively on a transparent substrate and capable of obtaining recording and reproducing signals satisfying the CD standards. As a result, it has been found that in spite of existence of the protective layer, the print portion surprisingly affects characteristics of the medium especially after a weathering test which is required for the CD standards such as a heat-cycle test, a high temperature and high humidity test and the like. It is considered that this is a phenomenon characteristic of the CD-R medium attributable to a poor adhesion of the interface between an organic dye and a metal.

In order to improve scratch resistance of the surface of a CD-R medium, it has been attempted to form two layers or more as a protective layer and provide an antiscratch layer as an outermost layer. In this case, characteristics of the medium are deteriorated remarkably due to a print portion.

SUMMARY OF THE INVENTION

Accordingly, It is a general object of the present invention to provide a recordable compact disc (CD-R) whose recording and reproducing signals satisfy the CD standards.

It is a more specific object of the present invention to provide an optical recording medium (CD-R) having characteristics that recording and reproducing signals does not change compared with the initial state even after a heat-cycle test, a high temperature and high humidity test and the like are conducted over a long period.

It is an additional object of the present invention to provide a highly reliable optical recording medium having at least one protective layer and at least one layered print portion.

In one aspect, the present invention provides an optical recording medium comprising a transparent substrate, a recording layer containing at least one organic dye overlying the substrate, a metallic layer directly contacting and overlying the recording layer, a protective layer comprising at least one layer directly contacting and overlying the metal layer, a layered print portion comprising at least one layer directly contacting and overlying the protective layer, and said protective layer and said print portion satisfying the following relationship:

$$\Sigma A_i B_i + \Sigma C_j D_j < 3 \ (\mu m) \quad (1)$$

where $A_i$ ($\mu$m) is a thickness and $B_i$ is a curing shrinkage rate of the i-th protective layer, respectively, where i is an integer of 1 or more, $C_j$ ($\mu$m) is a thickness and $D_j$ is a curing shrinkage rate of the j-th print portion layer, respectively, where j is an integer of 1 or more. In addition, it is preferable that the protective layer comprises at least two layers and the outermost protective layer is an antiscratch layer.

DESCRIPTION OF THE PREFERRED EMBODIMENTS

Figure 1:
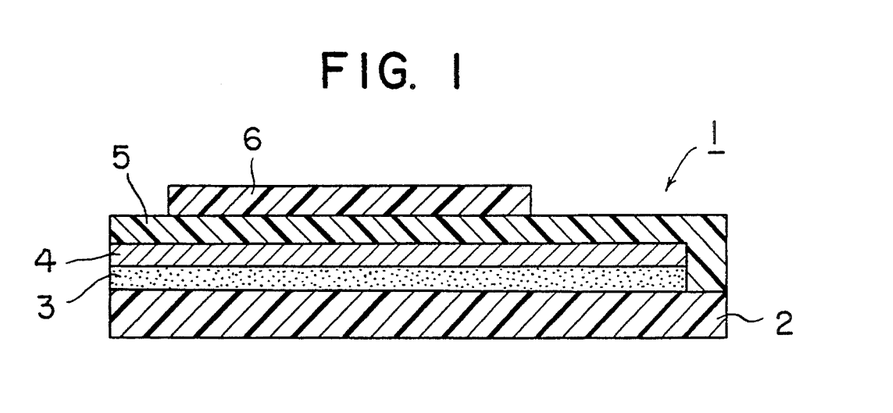
FIG. 1 is a cross sectional view showing an illustrative constitution of an optical recording medium according to the present invention.

In FIG. 1, an optical recording medium 1 according to the present invention comprises transparent substrate 2, recording layer 3, metallic layer 4, protective layer 5 and layered print portion 6. For the purpose of improving characteristics thereof, if necessary, a substrate-protective layer may be formed on the other side of transparent substrate 2, and an intermediate layer may be formed between transparent substrate 2 and recording layer 3, and another intermediate layer may be formed between recording layer 3 and metallic layer 4.

The optical recording medium of the present invention does not show any delamination of a dye-containing recording layer and a metallic reflective layer at the interface and maintains good signal characteristics and mechanical properties even after a long term durability test. The above-mentioned medium satisfying formula (1) means an optical recording medium wherein the whole sum of the respective product of a thickness multiplied by a curing shrinkage rate of protective layer 5 and print portion 6 is less than 3 $\mu$m. When optical recording medium 1 does not satisfy the condition of formula (1), that is, the maximum change of protective layer 5 and print portion 6 caused by curing shrinkage is 3 $\mu$m or more, delamination of the dye-containing recording layer and the metallic reflective layer occurs at the interface, and signal characteristics and mechanical properties do not meet the CD standards, and therefore the purposes of the present invention cannot be attained.

Protective layer 5 in accordance with the present invention is a layer covering uniformly at least a whole region where recording layer 3 and metallic layer 4 are provided and overlap each other on transparent substrate 1, or protective layer 5 covers uniformly at least a whole area where some information is preliminarily recorded. In the latter case, bar codes, prepits and the like may be formed on the metallic layer. In the present invention, i is an integer of 1 or more and is not limited particularly, however, it is preferred that i ranges from 1 to 5.

Layered print portion 6 is a layer formed on the protective layer 5 and part of a region where recording layer 3 and metallic layer 4 overlap each other or a layer formed on the protective layer 5 and part of a region where preliminary information is recorded. In the present invention, j is an integer of 1 or more and is not limited particularly, however, it is preferred that j ranges from 1 to 5.

Figure 2:
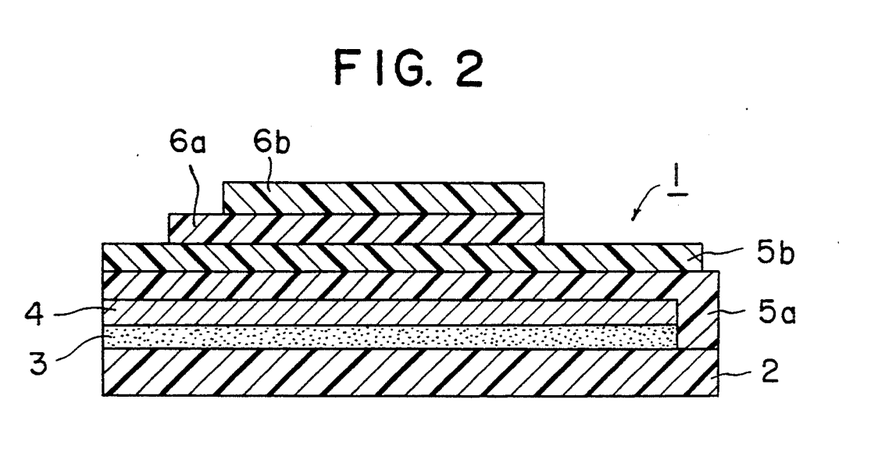
FIG. 2 is a cross sectional view showing another illustrative constitution of an optical recording medium according to the present invention.

As described above, protective layer 5 of the present invention may comprise two layers or more (a first protective layer 5a, a second protective layer 5b, . . . as in FIG. 2). In the case of two layers, for example, the first protective layer 5a is formed on said metallic layer and the thickness and the curing shrinkage rate of the first protective layer 5a are defined as A1 and B1, respectively. The second protective layer 5b as the outermost protective layer (an antiscratch protective layer) is formed on said first protective layer 5a and the film thickness and the curing shrinkage rate of the second protective layer 5b are defined as A2 and B2, respectively. In the case of three layers or more, it is the same as above. It is preferable that a protective layer comprises two layers or more and an antiscratch protective layer is formed as the outermost protective layer so as to improve scratch resistance of the surface.

As described above, layered print portion 6 of the present invention may comprise two layers or more (a first print portion 6a, a second print portion 6b, . . . ). In the case of two layers, for example, the first layered print portion 6a is formed on protective layer 5 and the thickness and the curing shrinkage rate of the first print portion 6a are defined as C1 and D1, respectively. The second layered print portion 6b is formed at least on the first print portion 6a and the thickness and the curing shrinkage rate of the second print portion 6b are defined as C2 and D2, respectively. In the case of three layers or more, it is the same as above.

The thickness described in the present specification is a value ($\mu$m) measured by a commercially available surface profile measuring system (for example, Dektak II made by SLOAN TECHNOLOGY CORP., Santa Barbara Calif. U.S.A.). In formula (1), for each layer, the maximum thickness is employed. In the present invention, "curing shrinkage rate" is a value that the decremental volume between a volume before curing and a volume after curing is divided by the volume before curing.

As transparent substrate 2 employed in the present invention, a high transparent material having a refractive index of 1.4–1.6 is preferable since it is necessary to record or read out signals. In addition, a substrate having a transmittance of 85% or more and small optical anisotropy is preferable. Exemplary suitable substrates include a substrate made of thermoplastic resins such as acrylic resins, polycarbonate resins, polyamide resins, vinyl chloride resins, polyolefin resins and the like. From the standpoints of mechanical strength, easy formation of guide grooves or prepits and economy, it is preferable to use an injection molded substrate made of acrylic resins, polycarbonate resins or polyolefin resins. A polycarbonate resin substrate is more preferable.

Transparent substrate 2 may be shaped in the form of a plate, a film, a circle or a card. Naturally the substrate may have on its surface guide grooves for indicating recording positions, pits for indicating recording positions or pits for partial reproducing-only information and the like. It is preferable to form such guide grooves, pits and the like when the substrate is fabricated by injection molding or cast molding. It is also possible to form such guide grooves, pits and the like by coating an ultraviolet ray-curable resin (hereinafter referred to as a UV-curable resin) on a substrate, mounting it on a stamper and exposing it to ultra violet rays.

According to the present invention, recording layer 3 comprises mainly organic dyes. Exemplary suitable dyes include: macrocyclic azaannulene dyes such as phthalocyanine dyes naphthalocyanine dyes porphyrin dyes and the like; polymethine dyes such as cyanine dyes merocyanine dyes styryl dyes squarylium dyes and the like; and further anthraquinone dyes azulenium dyes azo dyes and the like.

Among these dyes, phthalocyanine dyes and cyanine dyes are preferable. From the standpoint of obtaining fully effects of the present invention, the phthalocyanine dyes having high light resistance and durability are especially desirable.

In recording layer 3, the content of organic dyes is 30% or more, preferably 60% or more. Dyes employed in the present invention may be used alone or in combination. In addition, recording layer 3 may be a dye-containing layer comprising two layers or more. Moreover, the recording layer may be made of only dyes.

In order to improve recording characteristics and the like, when recording layer 3 is fabricated, the following materials may be employed, provided that effects of the present invention are not deteriorated: other organic dyes such as substituted phthalocyanine dyes substituted naphthalocyanine dyes substituted porphyrin dyes cyanine dyes dithiol metal complexes anthraquinone dyes and the like; organic metal complexes such as metallocene and the like; resins such as nitro cellose ethyl cellose acrylic resins polystyrene resins urethane resins and the like; and further leveling agents defoaming agents and the like.

Although recording layer 3 can be usually formed by means of spin-coating, dip-coating, spray-coating, roll-coating and the like, the spin-coating is preferable due to easy layer formation.

When the above-mentioned dyes are formed into a layer by spin-coating, a solvent not adversely affecting the substrate is employed. In the case of a polycarbonate substrate, exemplary suitable solvents include; aliphatic or alicyclic hydrocarbons such as hexane heptane octane decane cyclohexane methylcyclohexane and the like; non-polar ether solvents such as diethyl ether dibutyl ether diisopropyl ether and the like; polar alcohol solvents such as methyl alcohol ethyl alcohol isopropyl alcohol allyl alcohol methyl cellosolve and the like. A dye may be dissolved in the above-mentioned solvent or the mixture thereof and then the resulting solution may be coated.

According to the present invention, the thickness of recording layer 3 containing the above-mentioned dyes is usually in the range of 30–500 nm, preferably 50–250

As materials of metallic layer 4 (a reflective layer), there may be employed metals such as Au, Al, Ag, Pt, Pd, Ni, Cu and the like, metallic alloys, metallic compounds or the like. A metallic layer mainly comprising Au or a metallic alloy made of Au is preferable so as to attain a reflectivity of 70% or more required by the CD standards.

The metallic layer may be prepared by means of vapor deposition, sputtering, ion plating, spin-coating, spray-coating and the like.

According to the present invention, the thickness of the above-mentioned metallic layer 4 is usually in the range of 30–500 nm, preferably 50–200 nm.

As materials suitable for protective layer 5, there may be used resins having excellent impact resistance such as acrylic resins, polycarbonate resins, UV-curable resins, electron beam-curable resins, polysiloxane and the like.

Protective layer 5 may be usually formed by coating polymerizable monomer or oligomer and subjecting it to a cross-linking reaction.

Protective layer 5 may be made of an organic polymer as described above or may contain inorganic materials. The protective layer may be also formed by sputtering, chemical or physical vapor deposition of an inorganic source.

In the case where an organic polymer is prepared by cross-linking reaction, from the standpoint of operability, an advantageous preparation method comprises adding a small amount of a reaction initiator and a reaction catalyst to a mixture of a polymerizable organic compound monomer and oligomer having at least one reactive acryloyl group in the molecule, coating and cross-linking the resulting liquid mixture by ultraviolet ray or electron beam irradiation.

However, a cross-linking method is not limited to the above-mentioned methods. For example, in the case of epoxy resins or urethane resins, the cross-linking reaction may be carried out by heating, and in the case of a dialkoxy silane coupling agent, the cross-linking reaction may proceed with moisture in air.

A main chain and side chain in the cross-linked polymer thus obtained may be saturated or unsaturated hydrocarbons and may contain cyclic compounds such as melamine, bisphenol and the like. A main chain or side chain in the cross-linked polymer may contain other bonds such as polyether having at least one ether bond, polyester having ester bonds, polyurethane having urethane bonds, ionomer having ion bonds, polyamide having amide bonds, polysulfone having sulfone bonds, polysulfide having sulfide bonds and the like. A compolymer having two or more of these bonds may be also acceptable.

Moreover, fluorocarbons may be situated in a side chain so as to improve moisture resistance of the cross-linked polymer and epoxy resins may be contained in the side chain so as to prevent deterioration caused by hydrogen halide.

For the purpose of improving adhesion with reflective layer 4, a side chain may contain hydroxyl groups, carboxyl groups, acryl groups, amino groups, vinyl acetate groups and the like. In addition, a main chain or side chain may contain an ionic group.

When protective layer 5 is formed, in addition to reaction agents (polymerizable monomer or oligomer) and reaction initiators, solvents and diluents may be added to the coating solution containing resin so as to improve coating. In order to improve characteristics of a coated layer such as stability, smoothness and the like, the coating solution may contain leveling agents, defoaming agents, plasticizers, antioxidants, antistatic agents and the like. If necessary, the luster of protective layer 5 may be removed or the protective layer 5 may be colored using fillers, pigments, dyes and the like.

Protective layer 5 may be usually prepared by means of spin-coating, dip-coating, spray-coating, roll-coating, screen-printing and the like. For the purpose of easily preparing a layer, the spin-coating or screen-printing is preferable.

The thickness of a protective layer is usually in the range of 1 $\mu$m–100 $\mu$m. According to the present invention, the thickness of the above-mentioned protective layer 5 is in the range of 3–30 $\mu$m, preferably 5–20 $\mu$m.

A curing shrinkage rate of a protective layer is usually 20% or less, preferably 15% or less.

As described above, it is preferable to form an antiscratch protective layer as the outermost protective layer. Although materials, additives, preparation methods, thicknesses and curing shrinkage rates of an antiscratch protective layer may be the same as those of the abovementioned protective layer, high hardness materials containing organic or inorganic fillers are preferable since scratch resistance is required.

As materials of layered print portion 6 employed in the present invention, an acrylic-curable ink is preferable from the standpoint of operability. The acrylic-curable ink is a liquid ink comprising a mixture of polymerizable organic compound monomer and oligomer having at least one reactive acryloyl group in the molecule, and there may be added to the liquid ink a small amount of a reaction initiator and a reaction catalyst. The ink is color-controlled or luster-controlled by the addition of coloring agents such as pigments, dyes, fillers and the like. For the purpose of improving characteristics of printing, stability, smoothness and the like, leveling agents, defoaming agents, plasticizers, antioxidants, antistatic agents and the like may be contained in the ink. Printing is carried out on protective layer 5 according to a conventional screen printing or offset-printing and crosslinking is carried out by ultraviolet ray or electron beam irradiation to form layered print portion 6.

The thickness of a layered print portion is usually in the range of 1–100 $\mu$m, preferably 3–20 $\mu$m. A curing shrinkage rate is usually 20% or less, preferably 15% or less.

A method for recording information on optical recording medium 1 comprises, for example, rotating the optical recording medium 1 at a constant linear velocity, irradiating the bottom of a guide groove with laser beams through the transparent substrate 2 and information is recorded by forming pits (marks) in recording layer 3 overlying the guide groove. In this case, a preferable linear velocity is in the range of 1–10 m/sec, more preferably 1.2–2.8 m/sec. It is preferable to record EFM signals of the CD standards (pit length record). In general, as recording laser beams, there is employed semiconductor laser having oscillating wave length ranging from 600 nm to 900 nm. On the above-mentioned optical recording medium 1, it is possible to record information at a linear velocity of 1.4 m/sec with laser power of 10 mW or less using semiconductor laser having oscillating wave length of 785 nm. Also, when a linear velocity is 2.8 m/sec, it is possible to record information with laser power of 15 mW or less.

An organic dye contained in transparent substrate 2 and/or recording layer 3 absorbs laser beams and generates heat. As a result, the organic dye melts, vaporizes, sublime, deforms or changes in quality and pits are formed thereby. The shape of a pit is convex, wavy, concave or the like caused by change between transparent substrate 2 and recording layer 3, inside the recording layer, between the recording layer 3 and the metallic layer 4 or the like.

A method for reproducing information, for example, comprises rotating optical recording medium 1 on which information is recorded at a constant linear velocity, irradiating recording layer 3 through the transparent substrate 2 with semiconductor laser beams having laser power which does not affect the recording layer 3 and detecting the reflected light.

In the case of using EFM signals according to the CD standards, characteristics of reproducing signals recorded is evaluated by jitter showing fluctuation of recording pits, block error rate (BLER) showing error rate of EFM signals or the like. A jitter value showing good characteristics is less than 30 ns and a BLER value showing good characteristics is less than 220 cps, preferably less than 30 cps.

Results of weathering tests such as a heat cycle test, a high temperature and high humidity test and the like show some problems to overcome. First, recording characteristics deteriorate where a print portion overlies a protective layer. Secondly, when a protective layer is composed of two layers for the sake of preventing a scratch, strain of the print portion affects a recording layer and therefore it becomes difficult to read out recording signals even before the durability test.

Based on the medium constitution of a CD-R, it is considered that the above-mentioned phenomena is attributed to that delamination of a dye-containing recording layer and a metallic reflective layer occurs at the interface.

By controlling a thickness and a curing shrinkage rate of each of a protective layer and a layered print portion to the specific conditions as defined by formula(1), the storage stability of information can be secured even after a long-term durability test. The present invention can provide an optical recording medium having a useful protective layer and layered print portion, and the optical recording medium is highly reliable.

Therefore, the optical recording medium of the present invention is suitable for a long-term storage of medical examination data, photographs, official documents or the like. The optical recording medium of the present invention can be utilized just in the same way as a widely used and commercially available CD without providing any special storing conditions. Therefore, this medium has various applications such as Photo-CD, storage of music or data, limited publication of CD-ROM and the like.

EXAMPLE

The reliability of optical recording medium 1 of the present invention can be evaluated by a heat-cycle test (IEC Publication 68-2-38:ZAD test), a high temperature and high humidity test, a light resistance test (Sunshine carbon arc weather resistance test JIS B7753) or the like. High reliability of optical recording medium 1 means that jitter, BLER and the like of signal characteristics and a deflection amount and the like of mechanical properties show good values and do not change even after the abovementioned tests are conducted.

Antiscratch resistance of optical recording medium 1 of the present invention can be evaluated by scratching the surface thereof with a diamond probe of a commercially available scratch test apparatus under predetermined loading and observing degree of a scratch with a magnifying glass.

The following examples illustrate the present invention, however, it is to be understood that they are given for the purpose of illustration and not limitation.

Example 1

A 3.5 weight % dibutyl ether solution of a chlorinated (average 4 chlorine atoms per molecule) Pd-tetra(bisisopropylmethoxy)phthalocyanine dye having a bis(isopropyl)methoxy group at an a-position of each of the four benzene nucleuses in the phthalocyanine ring was spin-coated at 1200 rpm on an annular region (an inner diameter of 44.7 mm, an outer diameter of 118.0 mm, a recording region) of an injection molded polycarbonate substrate (1.2 mm in thickness, 120 mm in outer diameter) having a spiral groove (a guide groove; 1.6 μm in pitch, 0.6 μm in width, 0.07 μm in depth) and then the resulting coated substrate was dried at 70° C. for 2 hours. The thickness of the recording layer was 120 nm. To the recording layer was sputtered Au to form a metallic reflective layer having a thickness of 80 nm. A UV-curable resin SD-17 (manufactured by Dainippon Ink and Chemicals, Inc.) was spin-coated on the metallic layer and then was cured by UV irradiation to form a first protective layer having a thickness of 5 μm and a curing shrinkage of 12%. Further, a UV-curable resin "DAICURE" SSD MEDIUM (manufactured by Dainippon Ink and Chemicals, Inc.) was screen-printed on an annular region (an inner diameter of 40 mm, an outer diameter of 119 mm) of the first protective layer and then was cured by UV irradiation to form a second protective layer (an antiscratch protective layer) having a thickness of 8 μm and a curing shrinkage of 10%. Moreover, a UV-curable resin "DAICURE" SSD582 (manufactured by Dainippon Ink and Chemicals, Inc.) was screen-printed on part of the second protective layer and then was cured by UV irradiation to form a print portion having a thickness of 10 μm and a curing shrinkage of 10%.

EFM modulating signals were recorded on the resulting optical recording medium by changing laser power in the range of 4–10 mW at a linear velocity of 1.3 m/sec using an optical disc recording apparatus DDU-1000 (manufactured by Pulsetech Industrial Co. Ltd., a laser wave length of 781 nm) and an EFM signal encoder (manufactured by KENWOOD Co.).

The recorded signals were read out with a commercially available CD player (trade name "YAMAHA CDX1050"). As a result, when the recording laser power was 7 mW, the best error rate and jitter were obtained. Also, BLER was less than 20 cps and the jitter of a pit was 22 ns. It was found that the wave form of the recorded signals was substantially free from strain and excellent recording and reading out were conducted.

Scotch mending tape 810 was stuck to the protective layer and the layered print portion of the optical recording medium and then an exfoliation test was carried out. Any delamination was not observed.

Subjecting the medium to a ZAD test, the medium did not show any substantial change in both BLER and jitter even after 30 test cycles and satisfied the CD standards.

Subjecting the medium to a high temperature and humidity test at 80° C. and 85% RH, the medium did not show any substantial change in both BLER and jitter even after 1000 hours and satisfied the CD standards.

Subjecting the medium to a light resistance test (JIS B7753), the medium did not show any substantial change in both BLER and jitter even after 1000 hours and satisfied the CD standards.

The maximum deflection amount of the medium was less than ±0.3° at the beginning and did not become ±0.3° or more after these durability tests. Thus, good results were obtained.

The surface at the protective layer side of the medium was scratched with a scratch test apparatus CSR-01 (manufactured by RHESCA CO. LTD.), and as a result, no scratch was substantially observed even with a loading of 0.6 kg/cm$^2$.

Example 2

A 3.5 weight % dibutyl ether solution of a brominated (average 3 bromine atoms per molecule) Pd-tetra(bisisopropylmethoxy)phthalocyanine dye having a bis(isopropyl)methoxy group at an α-position of each of the four benzene nucleuses in the phthalocyanine ring was spincoated at 1200 rpm on the same injection molded polycarbonate substrate as that employed in Example 1 and the procedure of Example 1 was repeated. The resulting coated substrate was dried at 70° C. for 2 hours. The thickness of the recording layer was 120 nm. To the recording layer was sputtered Au to form a metallic reflective layer having a thickness of 80 nm. A UV-curable resin SD-17 (manufactured by Dainippon Ink and Chemicals, Inc.) was spin-coated on the metallic layer and then was cured by UV irradiation to form a first protective layer having a thickness of 5 μm and a curing shrinkage of 12%. Further, a UV-curable resin "DAICURE" SSD MEDIUM (manufactured by Dainippon Ink and Chemicals, Inc.) was offset-printed on an annular region (an inner diameter of 40 mm, an outer diameter of 119 mm) of the first protective layer and then was cured by UV irradiation to form a second protective layer (an antiscratch protective layer) having a thickness of 6 μm and a curing shrinkage of 10%. Moreover, a UV-curable resin "DAICURE" SSD583 (manufactured by Dainippon Ink and Chemicals, Inc.) was offset-printed on part of the second protective layer and then was cured by UV irradiation to form a first print portion having a thickness of 6 μm and a curing shrinkage of 10%. Further, a UV-curable resin "DAICURE" SSD582 was offset-printed on part of the first print portion and then was cured by UV irradiation to form a second print portion having a thickness of 6 μm and a curing shrinkage of 10%.

By the use of the same procedure as in Example 1, EFM modulating signals were recorded on the resulting optical recording medium by changing laser power in the range of 4–10 mW at a linear velocity of 1.3 m/sec and characteristics of reproducing were evaluated. As a result, when the recording laser power was 6.5 mW, the best error rate and Jitter were obtained. Also, BLER was less than 20 cps and the jitter of a pit was 22 ns. It was found that the wave form of the recorded signals was substantially free from strain and excellent recording and reading out were conducted.

Scotch mending tape 810 was stuck to the protective layer and the print portion of the optical recording medium and then an delamination test was carried out. Any delamination was not observed.

Subjecting the medium to a ZAD test, the medium did not show any substantial change in both BLER and jitter even after 30 test cycles and satisfied the CD standards.

Subjecting the medium to a high temperature and humidity test at 80° C. and 85% RH, the medium did not show any substantial change in both BLER and jitter even after 1000 hours and satisfied the CD standards.

Subjecting the medium to a light resistance test (JIS B7753), the medium did not show any substantial change in both BLER and jitter even after 1000 hours and satisfied the CD standards.

The maximum deflection amount of the medium was less than ±0.3° at the beginning and did not become ±0.3° or more after these durability tests. Thus, good results were obtained.

The surface at the protective layer side of the medium was scratched with a scratch test apparatus CSR-01 (manufactured by RHESCA CO. LTD.) and as a result, no scratch was substantially observed even with a loading of 0.6 kg/cm².

Example 3

A 3.5 weight % dibutyl ether solution of a brominated (average 3 bromine atoms per molecule) Pd-tetra(bisisopropylmethoxy)phthalocyanine dye having a bis(isopropyl)methoxy group at an α-position of each of the four benzene nucleuses in the phthalocyanine ring was spincoated at 1200 rpm on the same injection molded polycarbonate substrate as that employed in Example 1 and the procedure of Example 1 was repeated. The resulting product was dried at 70° C. for 2 hours. The thickness of the recording layer was 120 nm. To the recording layer was sputtered Au to form a metallic reflective layer having a thickness of 80 nm. A UV-curable resin SD-17 (manufactured by Dainippon Ink and Chemicals, Inc.) was spin-coated on the metallic layer and then was cured by UV irradiation to form a protective layer having a thickness of 5 μm and a curing shrinkage of 12%. Further, a UV-curable resin "DAICURE" SSD158 was screen-printed on part of the protective layer and was cured by UV irradiation to form a print portion having a thickness of 12 μm and a curing shrinkage of 10%.

By the use of the same procedure as in Example 1, EFM modulating signals were recorded on the resulting optical recording medium by changing laser power in the range of 4–10 mW at a linear velocity of 1.3 m/sec and characteristics of reproducing were evaluated. As a result, when the recording laser power was 6.5 mW, the best error rate and jitter were obtained. Also, BLER was less than 20 cps and the jitter of a pit was 22 ns. It was found that the wave form of the recorded signals was substantially free from strain and excellent recording and reading out were conducted.

Scotch mending tape 810 was stuck to the protective layer and the print portion of the optical recording medium and then an delamination test was carried out. Any delamination was not observed.

Subjecting the medium to a ZAD test, the medium did not show any substantial change in both BLER and jitter even after 30 test cycles and satisfied the CD standards.

Subjecting the medium to a high temperature and humidity test at 80° C. and 85% RH, the medium did not show any substantial change in both BLER and jitter even after 1000 hours and satisfied the CD standards.

Subjecting the medium to a light resistance test (JIS B7753), the medium did not show any substantial change in both BLER and jitter even after 1000 hours and satisfied the CD standards.

The maximum deflection amount of the medium was less than ±0.3° at the beginning and did not become ±0.3° or more after these durability tests. Thus, good results were obtained.

Example 4

A 3.5 weight % dibutyl ether solution of a brominated (average 3 bromine atoms per molecule) Pd-tetra(bisisopropylmethoxy)phthalocyanine dye having a bis(isopropyl)methoxy group at an a-position of each of the four benzene nucleuses in the phthalocyanine ring was spincoated at 1200 rpm on the same injection molded polycarbonate substrate as that employed in Example 1 and the procedure of Example 1 was repeated. The resulting product was dried at 70° C. for 2 hours. The thickness of the recording layer was 120 nm. To the recording layer was sputtered Au to form a metallic reflective layer having a thickness of 80 nm. A UV-curable resin SD-17 (manufactured by Dainippon Ink and Chemicals, Inc.) was spin-coated on the metallic layer and then was cured by UV irradiation to form a protective layer having a thickness of 5 μm and a curing shrinkage of 12%. Further, a UV-curable resin "DAICURE" SSD583 was screen-printed on part of the protective layer and was cured by UV irradiation to form a first print portion having a thickness of 10 μm and a curing shrinkage of 10%. Moreover, a UV-curable resin "DAICURE" SSD582 was screen-printed on part of the first print portion and was cured by UV irradiation to form a second print portion having a thickness of 10 μm and a curing shrinkage of 10%.

By the use of the same procedure as in Example 1, EFM modulating signals were recorded on the resulting optical recording medium by changing laser power in the range of 4–10 mW at a linear velocity of 1.3 m/sec and characteristics of reproducing were evaluated. As a result, when the recording laser power was 6.5 mW, the best error rate and Jitter were obtained. Also, BLER was less than 20 cps and the jitter of a pit was 22 ns. It was found that the wave form of the recorded signals was substantially free from strain and excellent recording and reading out were conducted.

Scotch mending tape 810 was stuck to the protective layer and the print portion of the optical recording medium and then a delamination test was carried out. Any delamination was not observed.

Subjecting the medium to a ZAD test, the medium did not show substantial any change in both BLER and jitter even after 30 test cycles and satisfied the CD standards.

Subjecting the medium to a high temperature and humidity test at 80° C. and 85% RH, the medium did not show substantial any change in both BLER and jitter even after 1000 hours and satisfied the CD standards.

Subjecting the medium to a light resistance test (JIS B7753), the medium did not show any substantial change in both BLER and jitter even after 1000 hours and satisfied the CD standards.

The maximum deflection amount of the medium was less than ±0.3° at the beginning and did not become ±0.3° or more after these durability tests. Thus, good results were obtained.

Comparative Example 1

A 3.5 weight % dibutyl ether solution of a chlorinated (average 4 chlorine atoms per molecule) Pd-tetra(bisisopropylmethoxy)phthalocyanine dye having a bis(isopropyl)methoxy group at an α-position of each of the four benzene nucleuses in the phthalocyanine ring was spincoated at 1200 rpm on the same injection molded polycarbonate substrate and the procedure of Example 1 was repeated. The resulting product was dried at 70° C. for 2 hours. The thickness of the recording layer was 120 nm. To the recording layer was sputtered Au to form a metallic reflective layer having a thickness of 80 nm. A UV-curable resin SD-17 (manufactured by Dainippon Ink and Chemicals, Inc.) was spin-coated on the metallic layer and then was cured by UV irradiation to form a first protective layer having a thickness of 8 μm and a curing shrinkage of 12%. Further, a UV-curable resin "DAICURE" SSD MEDIUM (manufactured by Dainippon Ink and Chemicals, Inc.) was screen-printed on an annular region (an inner diameter of 40 mm, an outer diameter of 119 mm) of the second protective layer and then was cured by UV irradiation to form a second protective layer having a thickness of 12 μm and a curing shrinkage of 10%. Moreover, a UV-curable resin "DAICURE" SSD582 (manufactured by Dainippon Ink and Chemicals, Inc.) was screen-printed on part of the second protective layer and then was cured by UV irradiation to form a print portion having a thickness of 12 μm and a curing shrinkage of 10%.

By the use of the same procedure as in Example 1, EFM modulating signals were recorded on the resulting optical recording medium by changing laser power in the range of 4–10 mW at a linear velocity of 1.3 m/sec and characteristics of reproducing were evaluated. As a result, when the recording laser power was 7 mW, the best error rate and jitter were obtained. Also, BLER was 50 cps and the jitter of a pit was 26 ns.

Scotch mending tape 810 was stuck to the protective layer and the print portion of the optical recording medium and then an delamination test was carried out. Any delamination was not observed.

Subjecting the medium to a ZAD test, after 5 cycles, delamination proceeded between Au metallic layer and the dye-containing recording layer of a recording region corresponding to the print portion. BLER became more than 220 cps and jitter exceeded 40 ns.

Subjecting the medium to a high temperature and humidity test at 80° C. and 85% RH, after 100 hours, delamination proceeded in between Au metallic layer and the dye-containing recording layer of a recording region corresponding to the print portion. BLER became more than 220 cps and jitter exceeded 40 ns.

The maximum deflection amount of the medium was +0.12° at the beginning and became ±0.3° or more after any of these durability tests.

Comparative Example 2

A 3.5 weight % dibutyl ether solution of a brominated (average 3 bromine atoms per molecule) Pd-tetra(bisisopropylmethoxy)phthalocyanine dye having a bis(isopropyl)methoxy group at an a-position of each of the four benzene nucleuses in the phthalocyanine ring was spincoated at 1200 rpm on the same injection molded polycarbonate substrate as that employed in Example 1 and the procedure of Example 1 was repeated. The resulting product was dried at 70° C. for 2 hours. The thickness of the recording layer was 120 nm. To the recording layer was sputtered Au to form a metallic reflective layer having a thickness of 80 nm. A UV-curable resin SD-17 (manufactured by Dainippon Ink and Chemicals, Inc.) was spin-coated on the metallic layer and then was cured by UV irradiation to form a first protective layer having a thickness of 8 μm and a curing shrinkage of 12%. Further, a UV-curable resin "DAICURE" SSD MEDIUM (manufactured by Dainippon Ink and Chemicals, Inc.) was screen-printed on an annular region (an inner diameter of 40 mm, an outer diameter of 119 mm) of the first protective layer and then was cured by UV irradiation to form a second protective layer having a thickness of 10 μm and a curing shrinkage of 10%. Moreover, a UV-curable resin "DAICURE" SSD583 was screenprinted on part of the second protective layer and then was cured by UV irradiation to form a first print portion having a thickness of 10 μm and a curing shrinkage of 10%.

Further, a UV-curable resin "DAICURE" SSD582 was screen-printed on part of the first print portion and then was cured by UV irradiation to form a second print portion having a thickness of 10 μm and a curing shrinkage of 10%.

By the use of the same procedure as in Example 1, EFM modulating signals were recorded on the resulting optical recording medium by changing laser power in the range of 4–10 mW at a linear velocity of 1.3 m/sec and characteristics of reproducing were evaluated. As a result, when the recording laser power was 6.5, the best error rate and jitter were obtained. Also, BLER was 120 cps and the jitter of a pit was 32 ns.

Scotch mending tape 810 was stuck to the protective layer and the print portion of the optical recording medium and then an delamination test was carried out. Any delamination was not observed.

Subjecting the medium to a ZAD test, after 5 cycles, delamination proceeded in between Au metallic layer and the dye-containing recording layer of a recording region corresponding to a portion where the first print portion and the second portion overlapped each other. BLER became more than 220 cps and jitter exceeded 40 ns.

Subjecting the medium to a high temperature and humidity test at 80° C. and 85% RH, after 100 hours, delamination proceeded in between Au metallic layer and the dye-containing recording layer of a recording region corresponding to a portion where the first print portion and the second portion overlapped each other. BLER became more than 220 cps and jitter exceeded 40 ns.

The maximum deflection amount of the medium was +0.1° at the beginning and became +0.3° or more after any of these durability tests.

Comparative Example 3

A 3.5 weight % dibutyl ether solution of a brominated (average 3 bromine atoms per molecule) Pd-tetra(bisisopropylmethoxy)phthalocyanine dye having a bis(isopropyl)methoxy group at an a-position of each of the four benzene nucleuses in the phthalocyanine ring was spincoated at 1200 rpm on the same injection molded polycarbonate substrate as that employed in Example 1 and the procedure of Example 1 was repeated. The resulting product was dried at 70° C. for 2 hours. The thickness of the recording layer was 120 nm. To the recording layer was sputtered Au to form a metallic reflective layer having a thickness of 80 nm. A UV-curable resin SD-17 (manufactured by Dainippon Ink and Chemicals, Inc.) was spin-coated on the metallic layer and then was cured by UV irradiation to form a protective layer having a thickness of 10 μm and a curing shrinkage of 12%. Further, a UV-curable resin "DAICURE" SSD158 was screen-printed on part of the protective layer and was cured by UV irradiation to form a print portion having a thickness of 20 μm and a curing shrinkage of 10%.

By the use of the same procedure as in Example 1, EFM modulating signals were recorded on the resulting optical recording medium by changing laser power in the range of 4–10 mW at a linear velocity of 1.3 m/sec and characteristics of reproducing were evaluated. As a result, when the recording laser power was 6.5 mW, the best error rate and jitter were obtained. Also, BLER was less than 20 cps and the jitter of a pit was 22 ns. It was found that the wave form of the recorded signals was substantially free from strain and excellent recording and reading out were conducted.

Scotch mending tape 810 was stuck to the protective layer and the print portion of the optical recording medium and then a delamination test was carried out. Any delamination was not observed.

Subjecting the medium to a ZAD test, after 5 cycles, delamination proceeded in between Au metallic layer and the dye-containing recording layer of a recording region corresponding to the print portion. BLER became more than 220 cps and jitter exceeded 40 ns.

Subjecting the medium to a high temperature and humidity test at 80° C. and 85% RH, after 100 hours, change in signals of the recording region corresponding to the print portion proceeded. BLER became more than 220 cps and jitter exceeded 40 ns.

The maximum warp amount of the medium was −0.01° at the beginning and was less than ±0.3° after any of these durability tests. Thus, good results were obtained

Comparative Example 4

A 3.5 weight % dibutyl ether solution of a brominated (average 3 bromine atoms per molecule) Pd-tetra(bisisopropylmethoxy)phthalocyanine dye having a bis(isopropyl)methoxy group at an α-position of each of the four benzene nucleuses in the phthalocyanine ring was spincoated at 1200 rpm on the same injection molded polycarbonate substrate as that employed in Example 1 and the procedure of Example 1 was repeated. The resulting product was dried at 70° C. for 2 hours. The thickness of the recording layer was 120 nm. To the recording layer was sputtered Au to form a metallic reflective layer having a thickness of 80 nm. A UV-curable resin SD-17 (manufactured by Dainippon Ink and Chemicals, Inc.) was spin-coated on the metallic layer and then was cured by UV irradiation to form a protective layer having a thickness of 8 μm and a curing shrinkage of 12%. Further, a UV-curable resin "DAICURE" SSD583 was screen-printed on part of the protective layer and was cured by UV irradiation to form a first print portion having a thickness of 12 μm and a curing shrinkage of 10%. Moreover, a UV-curable resin "DAICURE" SSD582 was screen-printed on part of the first print portion and was cured by UV irradiation to form a second print portion having a thickness of 12 μm and a curing shrinkage of 10%.

By the use of the same procedure as in Example 1, EFM modulating signals were recorded on the resulting optical recording medium by changing laser power in the range of 4–10 mW at a linear velocity of 1.3 m/sec and characteristics of reproducing were evaluated. As a result, when the recording laser power was 6.5 mW, the best error rate and Jitter were obtained. Also, BLER was less than 20 cps and the Jitter of a pit was 21 ns. It was found that the wave form of the recorded signals was substantially free from strain and excellent recording and reading out were conducted.

Scotch mending tape 810 was stuck to the protective layer and the print portion of the optical recording medium and then a delamination test was carried out. Any delamination was not observed.

Subjecting the medium to a ZAD test, after 5 cycles, delamination proceeded in between Au metallic layer and the dye-containing recording layer of a recording region corresponding to a portion where the first print portion and the second print portion overlapped each other. BLER became more than 220 cps and jitter exceeded 40 ns.

Subjecting the medium to a high temperature and humidity test at 80° C. and 85% RH, after 100 hours, there proceeded change in signals of the recording region corresponding to a portion where the first print portion and the second print portion overlapped each other. BLER became more than 220 cps and jitter exceeded 40 ns. Thus, good results were obtained.

The maximum deflection amount of the medium was −0.02° at the beginning and was less than ±0.3° after any of these durability tests.

Table 1 shows results obtained by various tests.

TABLE 1

| | Protective layer | | Print portion | | |
|---|---|---|---|---|---|
| | Thickness $A_i$ | Hardening shrinkage $B_i$ | Thickness $C_j$ | Hardening shrinkage $D_j$ | $\Sigma A_i B_i + \Sigma C_j D_j$ |
| Example 1 | $i = 1.2$ 5 μm 8 μm | $i = 1.2$ 0.12 0.10 | $j = 1$ 10 μm | $j = 1$ 0.10 | 2.4 μm |
| Example 2 | $i = 1.2$ 5 μm 6 μm | $i = 1.2$ 0.12 0.10 | $j = 1.2$ 6 μm 6 μm | $j = 1.2$ 0.10 0.10 | 2.4 μm |
| Example 3 | $i = 1$ 5 μm | $i = 1$ 0.12 | $j = 1$ 12 μm | $j = 1$ 0.10 | 1.8 μm |
| Example 4 | $i = 1$ 5 μm | $i = 1$ 0.12 | $j = 1.2$ 8 μm 8 μm | $j = 1.2$ 0.10 0.10 | 2.2 μm |
| Comparative Example 1 | $i = 1.2$ 8 μm 12 μm | $i = 1.2$ 0.12 0.10 | $j = 1$ 12 μm | $j = 1$ 0.10 | 3.4 μm |
| Comparative Example 2 | $i = 1.2$ 8 μm 10 μm | $i = 1.2$ 0.12 0.10 | $j = 1.2$ 10 μm 10 μm | $j = 1.2$ 0.10 0.10 | 4.0 μm |
| Comparative Example 3 | $i = 1$ 10 μm | $i = 1$ 0.12 | $j = 1$ 20 μm | $j = 1$ 0.10 | 3.2 μm |
| Comparative Example 4 | $i = 1$ 8 μm | $i = 1$ 0.12 | $j = 1.2$ 12 μm 12 μm | $j = 1.2$ 0.10 0.10 | 3.4 μm |

| Initial characteristics BLER jitter | ZAD test BLER jitter | 80° C. 85% test BLER jitter | Evaluation for medium after durability tests |
|---|---|---|---|

TABLE 1-continued

| Example | | | | |
|---|---|---|---|---|
| Example 1 | | 30 cycles | 1000 hr | |
| | <20 cps | <20 cps | <20 cps | good |
| | 22 ns | 22 ns | 22 ns | |
| Example 2 | | 30 cycles | 1000 hr | |
| | <20 cps | <20 cps | <20 cps | good |
| | 20 ns | 22 ns | 21 ns | |
| Example 3 | | 30 cycles | 1000 hr | |
| | <20 cps | <20 cps | <20 cps | good |
| | 20 ns | 20 ns | 20 ns | |
| Example 4 | | 30 cycles | 1000 hr | |
| | <20 cps | <20 cps | <20 cps | good |
| | 20 ns | 22 ns | 23 ns | |
| Comparative | | 5 cycles | 100 hr | |
| Example 1 | 50 cps | >220 cps | >220 cps | poor |
| | 26 ns | >40 ns | >40 ns | |
| Comparative | | 5 cycles | 100 hr | |
| Example 2 | 120 cps | >220 cps | >220 cps | poor |
| | 32 ns | >40 ns | >40 ns | |
| Comparative | | 5 cycles | 100 hr | |
| Example 3 | 30 cps | >220 cps | >220 cps | poor |
| | 22 ns | >40 ns | >40 ns | |
| Comparative | | 5 cycles | 100 hr | |
| Example 4 | <20 cps | >220 cps | >220 cps | poor |
| | 21 ns | >40 ns | >40 ns | |

What is claimed is:

1. An optical recording medium comprising
a transparent substrate,
a recording layer containing at least one organic dye overlying the substrate,
a metallic layer directly contacting and overlying the recording layer,
a protective layer comprising two layers or more directly contacting and overlying the metal layer, where the outermost protective layer is an antiscratch layer,
a layered ultraviolet ray cured or electron beam cured print portion comprising at least one layer directing contacting and overlying the protective layer,
and said protective layer and said print portion are arranged so as to satisfy the following relationship:

$$\Sigma A_i B_i + \Sigma C_j D_j < 3 \ (\mu m) \quad (1)$$

where Ai (μm) is a thickness and Bi is a curing shrinkage rate of the i-th protective layer, respectively, where i is an integer of 1 or more, Cj (μm) is a thickness and Dj is a curing shrinkage rate of the j-th print portion layer, respectively, where j is an integer of 1 or more.

2. The optical recording medium of claim 1, wherein said transparent substrate has a refractive index of 1.4–1.6.

3. The optical recording medium of claim 1, wherein said transparent substrate is selected from the group consisting of an acrylic resin, a polycarbonate resin, a polyamide resin, a vinyl chloride resin and a polyolefin resin.

4. The optical recording medium of claim 1, wherein said organic dye in said recording layer is selected from the group consisting of macrocyclic azaannulene dyes, polymethine dyes, anthraquinone dyes, azulenium dyes and azo dyes.

5. The optical recording medium of claim 4, wherein said organic dye is selected from the group consisting of phthalocyanine dyes, naphthalocyanine dyes, porphyrin dyes, cyanine dyes, merocyanine dyes, styryl dyes, squarylium dyes, anthraquinone dyes, azulenium dyes and azo dyes.

6. The optical recording medium of claim 5, wherein said organic dye is a phthalocyanine dye or cyanine dye.

7. The optical recording medium of claim 1, wherein said recording layer contains 30% or more of said organic dye.

8. The optical recording medium of claim 7, wherein said recording layer contains 60% or more of said organic dye.

9. The optical recording medium of claim 1, wherein the thickness of said recording layer is in the range of 30 to 500 nm.

10. The optical recording medium of claim 9, wherein said thickness is in the range of 50 to 250 nm.

11. The optical recording medium of claim 1, wherein said metallic layer comprises a member selected from the group consisting of Au, Al, Ag, Pt, Pd, Ni, Cu, metallic alloys thereof and metallic compounds thereof.

12. The optical recording medium of claim 11, wherein said metallic layer comprises Au or a metallic alloy of Au.

13. The optical recording medium of claim 1, wherein the thickness of said metallic layer is in the range of 30 to 500 nm.

14. The optical recording medium of claim 13, wherein said thickness is 50 to 200 nm.

15. The optical recording medium of claim 1, wherein said protective layer is comprised of the resin selected from the group consisting of acrylic resins, polycarbonate resins, UV-curable resins, electron beam-curable resins and polysiloxane resins.

16. The optical recording medium of claim 1, wherein the thickness of said protective layer is in the range of 1 to 100 μm.

17. The optical recording medium of claim 16, wherein said thickness is in the range of 3 to 30 μm.

18. The optical recording medium of claim 17, wherein said thickness is in the range of 5 to 20 μm.

19. The optical recording medium of claim 1, wherein said print portion comprises an acrylic-curable ink.

20. The optical recording medium of claim 1, wherein the thickness of said layered print portion is in the range of 1 to 100 μm.

21. The optical recording medium of claim 20, wherein said thickness is in the range of 3 to 20 μm.

22. The optical recording medium of claim 1, wherein said protective layer effectively prevents delamination caused by said print portion between said metallic layer and said recording layer containing an organic dye.

23. The optical recording medium of claim 1, wherein said medium has a jitter value less than 30 ns.

24. The optical recording medium of claim 1, wherein said medium has a block error rate less than 220 cps.

25. The optical recording medium of claim 24, wherein said block error rate is less than 30 cps.

* * * * *

UNITED STATES PATENT AND TRADEMARK OFFICE
CERTIFICATE OF CORRECTION

PATENT NO. : 5,422,226
DATED : JUNE 6, 1995
INVENTOR(S) : SHIN AIHARA ET AL.

It is certified that error appears in the above-identified patent and that said Letters Patent is hereby corrected as shown below:

Column 2, line 42, "Accordingly, It is"

should read --Accordingly, it is--.

Column 5, lines 3-8, "include: macrocyclic azaannulene dyes such as phthalocyanine dyes naphthalocyanine dyes porphyrin dyes and the like; polymethine dyes such as cyanine dyes merocyanine dyes styryl dyes squarylium dyes and the like; and further anthraquinone dyes azulenium dyes azo dyes and the like."

should read --include: macrocyclic azaannulene dyes, such as phthalocyanine dyes, naphthalocyanine dyes, porphyrin dyes and the like; polymethine dyes such as cyanine dyes, merocyanine dyes, styryl dyes, squarylium dyes and the like; and further, anthraquinone dyes, azulenium dyes, azo dyes and the like.--.

UNITED STATES PATENT AND TRADEMARK OFFICE
CERTIFICATE OF CORRECTION

PATENT NO. : 5,422,226
DATED : JUNE 6, 1995
INVENTOR(S) : SHIN AIHARA ET AL.

It is certified that error appears in the above-identified patent and that said Letters Patent is hereby corrected as shown below:

Column 5, lines 23-31, "deteriorated: other organic dyes such as substituted phthalocyanine dyes substituted naphthalocyanine dyes substituted porphyrin dyes cyanine dyes dithiol metal complexes anthraquinone dyes and the like; organic metal complexes such as metallocene and the like; resins such as nitro cellose ethyl cellose acrylic resins polystyrene resins urethane resins and the like; and further leveling agents defoaming agents and the like."

should read --deteriorated: other organic dyes, such as substituted phthalocyanine dyes, substituted naphthalocyanine dyes, substituted porphyrin dyes, cyanine dyes, dithiol metal complexes, anthraquinone dyes and the like; organic metal complexes such as metallocene and the like; resins such as nitro cellose, ethyl cellose, acrylic resins, polystyrene resins, urethane resins and the like; and further, leveling agents, defoaming agents and the like.--

UNITED STATES PATENT AND TRADEMARK OFFICE
CERTIFICATE OF CORRECTION

PATENT NO. : 5,422,226
DATED : JUNE 6, 1995
INVENTOR(S) : SHIN AIHARA ET AL.

It is certified that error appears in the above-identified patent and that said Letters Patent is hereby corrected as shown below:

Column 5, lines 40-47, "solvents include; aliphatic or alicyclic hydrocarbons such as hexane heptane octane decane cyclohexane methylcyclohexane and the like; non-polar ether solvents such as diethyl ether dibutyl ether diisopropyl ether and the like; polar alcohol solvents such as methyl alcohol ethyl alcohol isopropyl alcohol allyl alcohol methyl cellosolve and the like."

should read --solvents include; aliphatic or alicyclic hydrocarbons, such as hexane, heptane, octane, decane, cyclohexane, methylcyclohexane and the like; non-polar ether solvents such as diethyl ether, dibutyl ether, diisopropyl ether and the like; polar alcohol solvents such as methyl alcohol, ethyl alcohol, isopropyl alcohol, allyl alcohol, methyl cellosolve and the like.--.

UNITED STATES PATENT AND TRADEMARK OFFICE
CERTIFICATE OF CORRECTION

PATENT NO. : 5,422,226
DATED : JUNE 6, 1995
INVENTOR(S) : SHIN AIHARA ET AL.

It is certified that error appears in the above-identified patent and that said Letters Patent is hereby corrected as shown below:

Column 5, line 52, "preferably 50-250"

should read --preferably 50-250 nm.--.

Column 10, line 52, "then an delamination"

should read --then a delamination--.

Column 11, line 44, "then an delamination"

should read --then a delamination--.

Column 12, lines 38 and 43, "did not show substantial any"

should read --did not show any substantial--.

UNITED STATES PATENT AND TRADEMARK OFFICE
CERTIFICATE OF CORRECTION

PATENT NO.   : 5,422,226
DATED        : June 6, 1995
INVENTOR(S)  : Shin Aihara et al It is certified that error appears in the above-identified patent and that said Letters Patent is hereby corrected as shown below:

Column 13,    line 27, "then an delamination"

should read --then a delamination--.

Column 14,    line 20, "then an delamination"

should read --then a delamination--.

Column 15,    line 23, "obtained"

should read --obtained.--.

Signed and Sealed this

Thirty-first Day of March, 1998

*Attest:*

BRUCE LEHMAN

*Attesting Officer*      *Commissioner of Patents and Trademarks*